(12) United States Patent
Neuhaus et al.

(10) Patent No.: US 6,889,150 B2
(45) Date of Patent: May 3, 2005

(54) METHOD FOR DETERMINING AND REPRESENTING AN OPTIMAL ARRANGEMENT AND INSTALLATION OF A RADIOMETRIC MEASURING SYSTEM

(75) Inventors: Joachim Neuhaus, Steinen (DE); Wolfgang Kämereit, Maulburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/130,318

(22) PCT Filed: Jan. 29, 2002

(86) PCT No.: PCT/EP02/00892

§ 371 (c)(1),
(2), (4) Date: Jan. 21, 2004

(87) PCT Pub. No.: WO02/061513

PCT Pub. Date: Aug. 8, 2002

(65) Prior Publication Data

US 2004/0128098 A1 Jul. 1, 2004

(30) Foreign Application Priority Data

Jan. 30, 2001 (DE) .......................................... 101 04 165

(51) Int. Cl.⁷ ........................... G01D 18/00; G01L 15/00
(52) U.S. Cl. .......................................... 702/85; 702/121
(58) Field of Search .......................... 702/85, 121, 122, 702/134, 138, 140

(56) References Cited

U.S. PATENT DOCUMENTS 5,675,499 A  10/1997  Lee et al.
5,757,659 A * 5/1998  Arai et al. ..................... 702/22
6,006,604 A  12/1999  Rabelo et al.

\* cited by examiner

Primary Examiner—Bryan Bui
Assistant Examiner—Meagan S Walling
(74) Attorney, Agent, or Firm—Bacon & Thomas

(57) ABSTRACT

The invention relates to a method for determining and presenting an optimized arrangement and assembly of a measurement system of process measurement technology, especially of a radiometric measurement system, at a container or pipe, in which measurement system at least one characterizing parameter of a medium contained in the container or pipe is to be measured.

Figure 13:
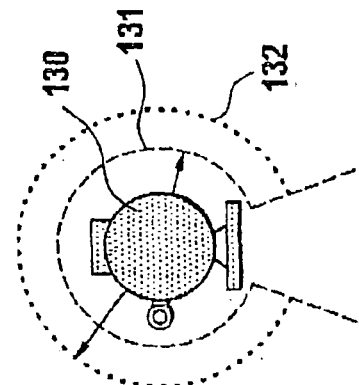

The method proceeds with the aid of at least a first electronic computer (10) and a second electronic computer (11) connected therewith and containing a display- (12), a processor-controlled, data processing- (15) and an input-device (13), wherein container- or pipe-specific data and information on medium and on expected measurement range are taken into consideration. The method establishes therefrom an optimized arrangement of the measurement system at or on the container or pipe and presents this arrangement in a sketch.

The invention produces at greatest possible speeds the optimized design of the measurement system, also respecting safety aspects, and this in direct contact between a customer and a manufacturer of such a measurement system, or a project planer.

21 Claims, 7 Drawing Sheets

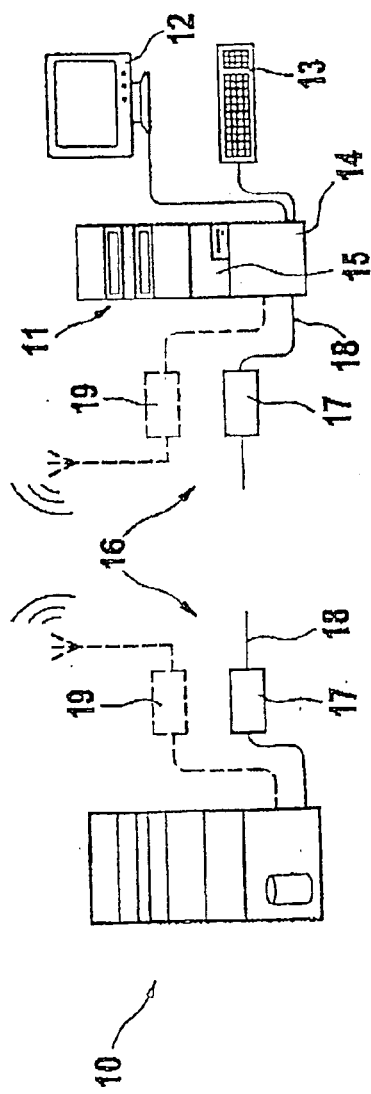
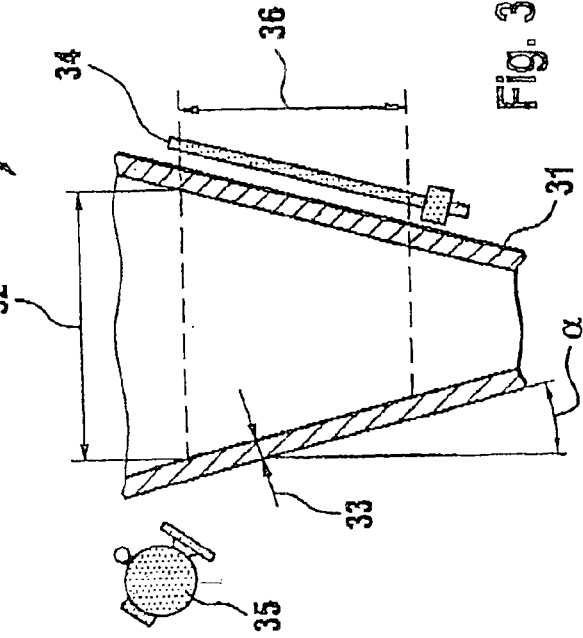
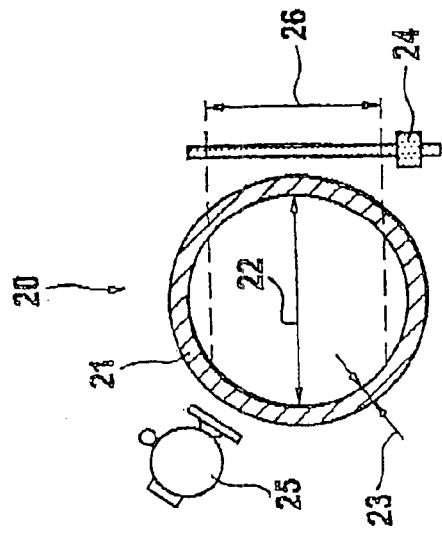

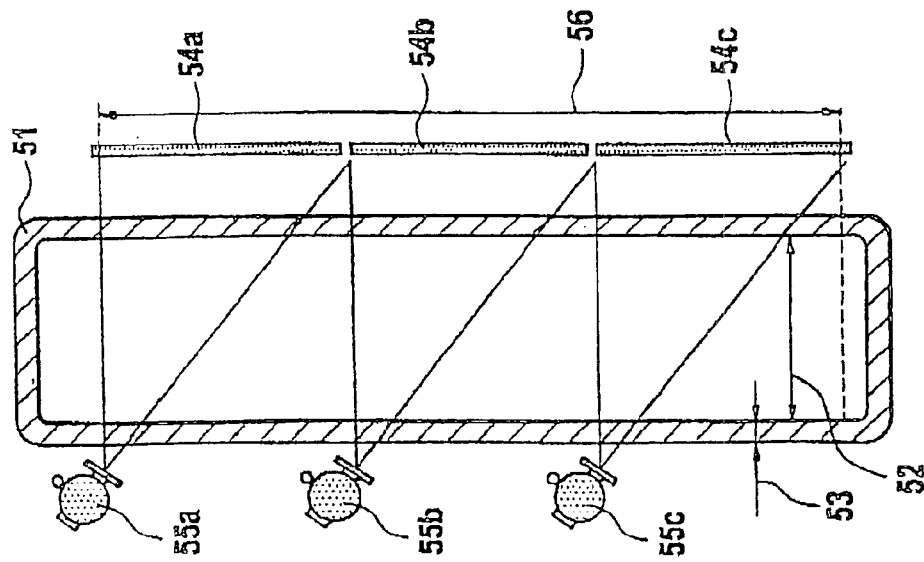
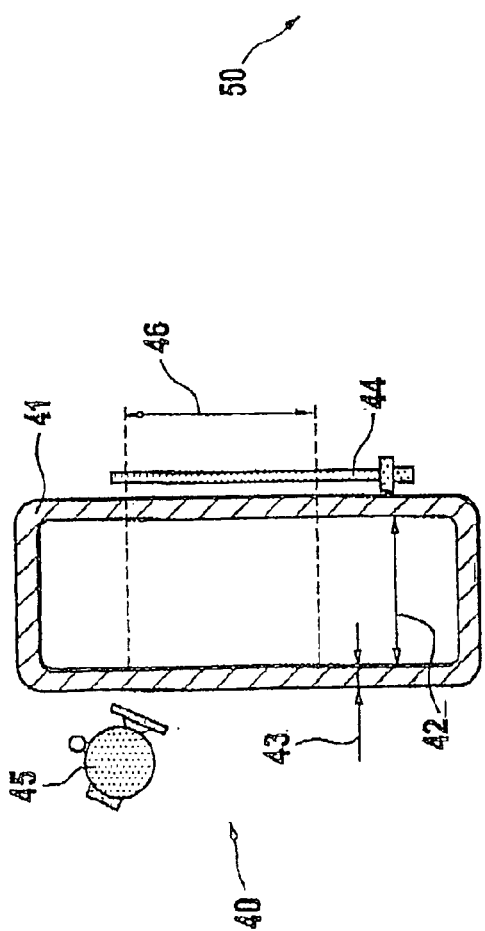
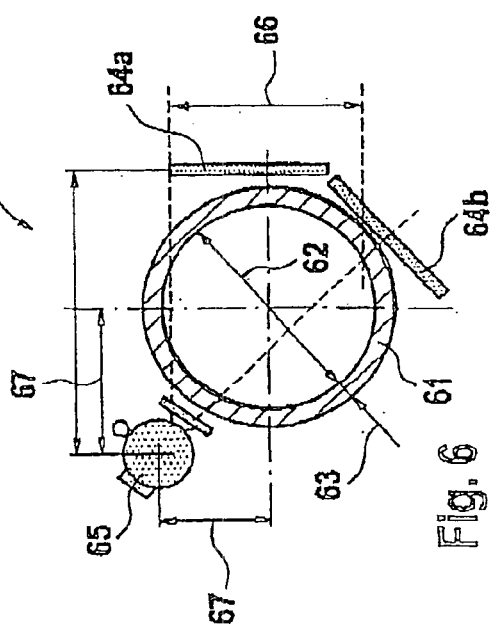

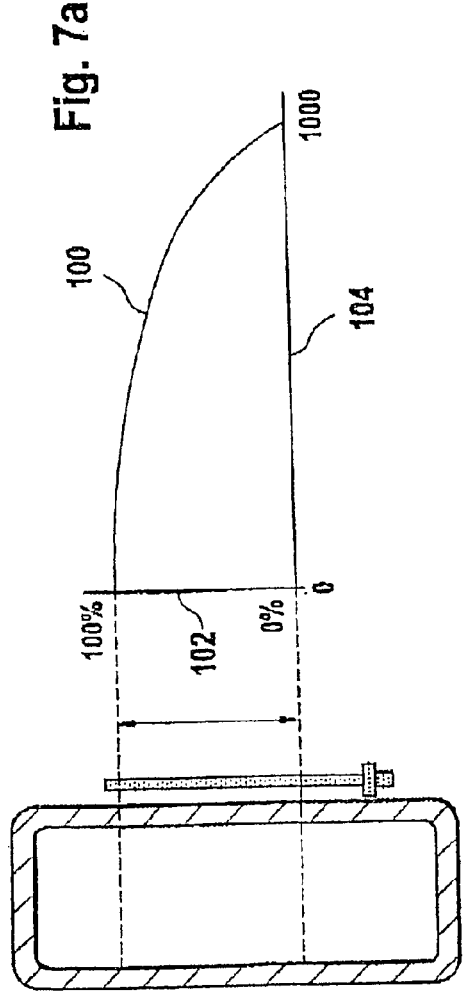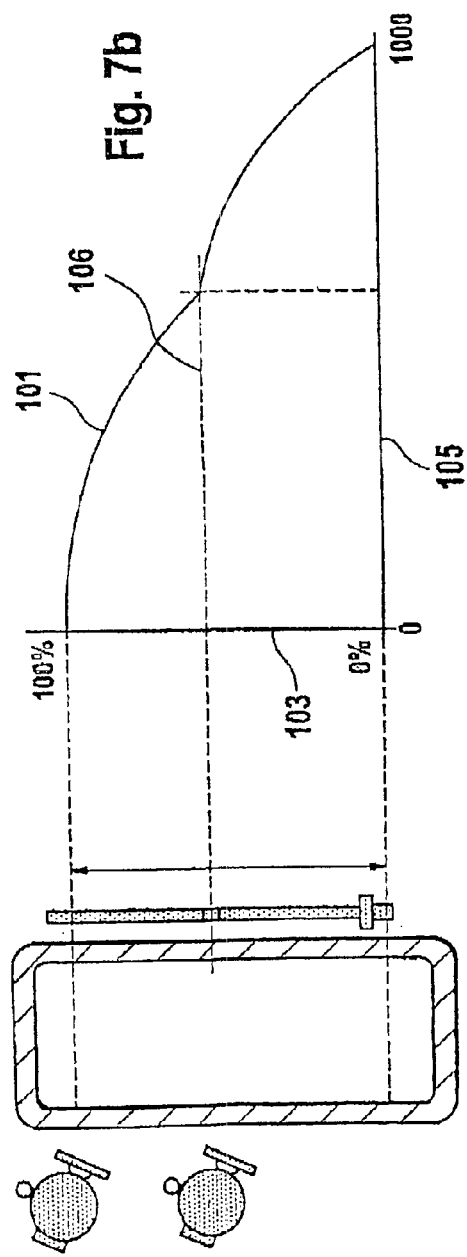

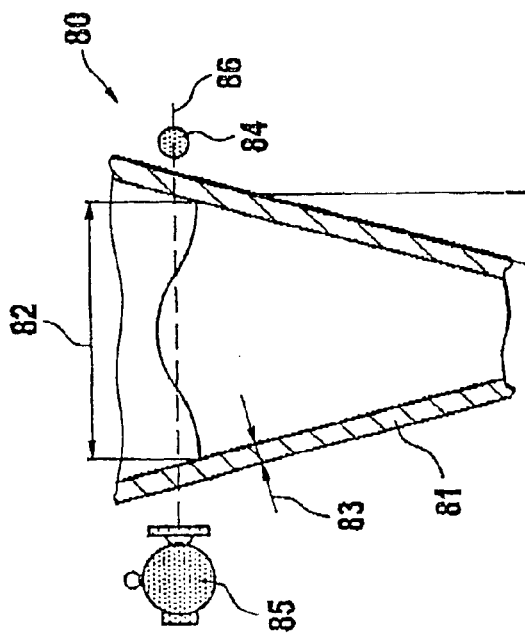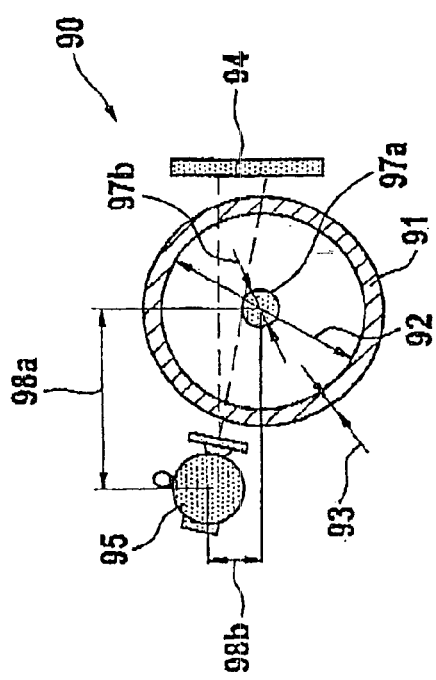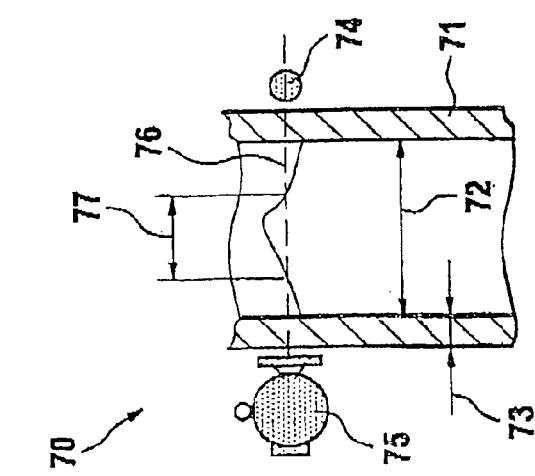

US 6,889,150 B2

METHOD FOR DETERMINING AND REPRESENTING AN OPTIMAL ARRANGEMENT AND INSTALLATION OF A RADIOMETRIC MEASURING SYSTEM

TECHNICAL FIELD

The invention relates to a method for determining and presenting an optimized arrangement and assembling of a radiometric measurement system, or a measurement site, of an industrial process measurement- and/or process control-installation, which measurement system serves for the measurement of at least one process variable or process parameter.

BACKGROUND

Such measurement systems for an industrial process measurement- and/or process control-installation are, for example, those which are placed at or in a container or pipe and with which process variables or process parameters, such as e.g. pressure, difference pressure, fill level, limit level and/or density of a medium in the container or pipe are registered or determined. The way and manner, in which these process variables or process parameters are registered or determined, is known per se.

In this connection, particularly radiometric measurement systems for measuring a characterizing parameter, such as e.g. fill level, limit level and/or density of a medium, include essentially at least one radioactive source of radiation and at least one detector, which is usually associated with a transmitter, which in turn transmits the signals corresponding to the measurement parameters to a control room or measurement station.

According to a usual method for determining an optimized arrangement of a radiometric measurement system at a container or pipe, a customer, or a representative of a customer, that desires to buy and install such an installation, transmits the requisite container, pipe and/or medium data for determining the arrangement of the radiometric measurement system, mostly by telephone facsimile, to a manufacturer of such radiometric measurement systems. At the manufacturer, an appropriately schooled team member uses the data transmitted from the customer and the characterizing data of the components offered by the manufacturer to calculate at least one arrangement for a measurement system and sends the customer a corresponding proposal for the design of the measurement system.

The disadvantage of the usual method resides in its being time consuming and its requiring in many cases further correspondence.

Another method for determining an optimized arrangement of a radiometric measurement system at a container or pipe is one where a manufacturer makes a suitable software available to an interested customer. This software can be installed at the customer's location on a computer, so that the customer can itself calculate the desired arrangement of the radiometric system.

It has become apparent that, in this method and especially in the operation of the software at the customer's location, exact knowledge of the different measurement procedures, for example that of fill level measurement and particularly the radiometry and the physical fundamentals associated therewith, as regards radiation protection-relevant regulations, etc., is assumed to be present, but in many cases is not. Since the design of the system is done by the customer itself, the manufacturer of such measurement systems is usually not responsible for damages, which are caused by incorrect measurement system design done by the customer itself.

SUMMARY OF THE INVENTION

It is, consequently, an object of the invention to avoid the above-mentioned disadvantages and to provide to the customer, as quickly as possible, also with respect to safety aspects, an optimized design of a measurement system from industrial process measurement technology, for example a measurement system for fill level measurement, particularly a radiometric measurement system. As a bonus, the customer can then, if needed, release an order as quickly as possible.

To achieve this object, the invention proposes a method for determining and presenting an optimized arrangement and assembling of a measurement system, or a measurement site, of an industrial process measurement- and/or process control-installation, which measurement system serves for the measurement of at least one process variable or process parameter and which method runs with the help of at least a first electronic computer and a second electronic computer connected therewith comprising a display-device, a processor-controlled data processing-device, and an input-device, and includes the following steps:

a) Based on process-specific data, particularly those which have an influence on the process parameters measured by the measurement system and transmitted from the second computer to and into the first computer, an optimized arrangement of the measurement system is calculated;

b) then a schematic drawing showing the optimized arrangement is produced and presented on the display device of the second computer.

A preferred embodiment of the method of the invention concerns the determining and presenting of an optimized arrangement and assembling of a radiometric measurement system at a container or pipe, which measurement system serves for the measuring of at least one characterizing parameter of a medium contained in the container or pipe, which method proceeds with the help of the first electronic computer and the second computer connected therewith and includes the following steps:

a) Based on container- or pipe-specific data, especially information on basic shape and on position, diameter, wall thickness and/or materials and on a measurement range to be expected, which are transmitted from the second computer to and into the first computer, an optimized arrangement of at least one radiation source and at least one radiation detector of the radiometric measurement system at or on the container or pipe is calculated;

b) then the radiation source, or sources, activity best suited for the measurement or measurements is calculated;

c) then a schematic drawing showing the container or the pipe and the radiometric measurement system arrangement optimized therefor is produced and presented on the display device of the second computer.

In a preferred embodiment of the method of the invention, a linearizing curve is additionally provided, which is valid for the special, optimized arrangement of the radiometric measurement system at the container or pipe. This curve serves for correcting the measurement parameters measured with the one or more detectors.

In another preferred embodiment of the invention, in a subsequent method step on the first computer using device-specific data in a database administered from there, a selection of suitable devices or components for a radiometric measurement system corresponding to the optimized arrangement is established and compiled and subsequently transmitted to the second computer and presented on its display device.

Other preferred embodiments of the invention concern the desired kind or kinds of measurements in the pipe or container; be it a measurement of a fill level, a limit level or a density of the medium contained in the container or pipe, or some combination of such measurements.

Other preferred embodiments of the invention concern the determining and presenting of additional accessories for the radiometric measurement system, relevant calculations for at least one radiation protection container for the radiation source or sources or for at least one radiation detector and/or for an empty container or an empty pipe for the target.

Still other preferred embodiments of the invention deal with means and methods for data transmission between the first and the second computers and in order that the second computer is a stand-alone computer or a work station of a network including other computers.

In still another preferred embodiment of the method of the invention, it is provided that a further determining and presenting of an optimized arrangement and assembling of a radiometric measurement system at a container or pipe is carried out on the basis of another radiation source or sources and the results are presented on the second computer.

Still another preferred embodiment of the invention concerns the determining and presenting of an optimized arrangement and assembling of at least one pressure measurement system at a container or pipe, which measurement system serves for measuring a pressure and/or a pressure difference.

The invention is based on the idea of providing a suitable method for determining and presenting an optimized arrangement and assembling of a measurement system of the industrial process measurement technology, for example a fill level measurement system, especially a radiometric measurement system, at a container or pipe for measuring at least one characterizing parameter of a medium contained in the container or pipe, which method serves to determine and design the desired radiometric system in cooperation between the customer and the manufacturer. For reasons of safety, a manufacturer can then contribute its know-how and its experience with such radiometric installations in direct contact with the customer.

The special advantage of the invention is evident in that standard- and special-arrangements and designs of measurement systems of the industrial measurement technology, for example fill level measurement systems, especially radiometric measurement systems, can be carried out more or less in dialog with, and by, non-experts. The method offers, moreover, the possibility of transmitting to the particular interested parties or customers comprehensive information on the individual components and relevant information on the safety of the particular radiometric installation, be it with regard to technical matters or with respect to the applicable regulations.

BRIEF DESCRIPTIONS OF THE DRAWINGS

Figure 12:
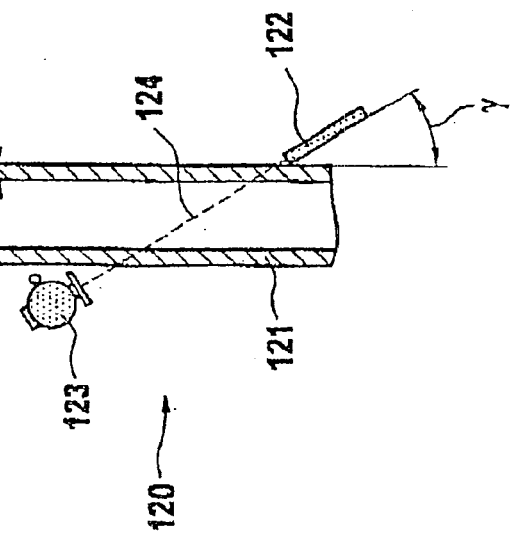
Figure 11:
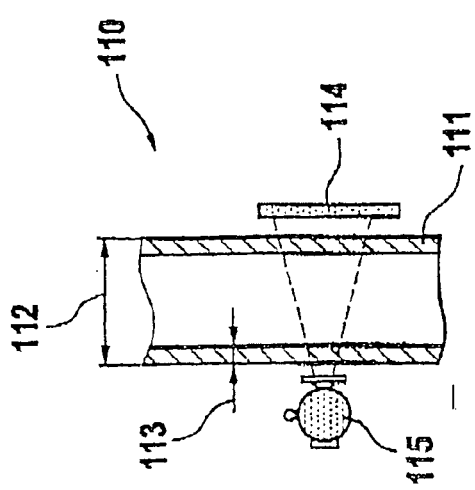
Figure 14A:
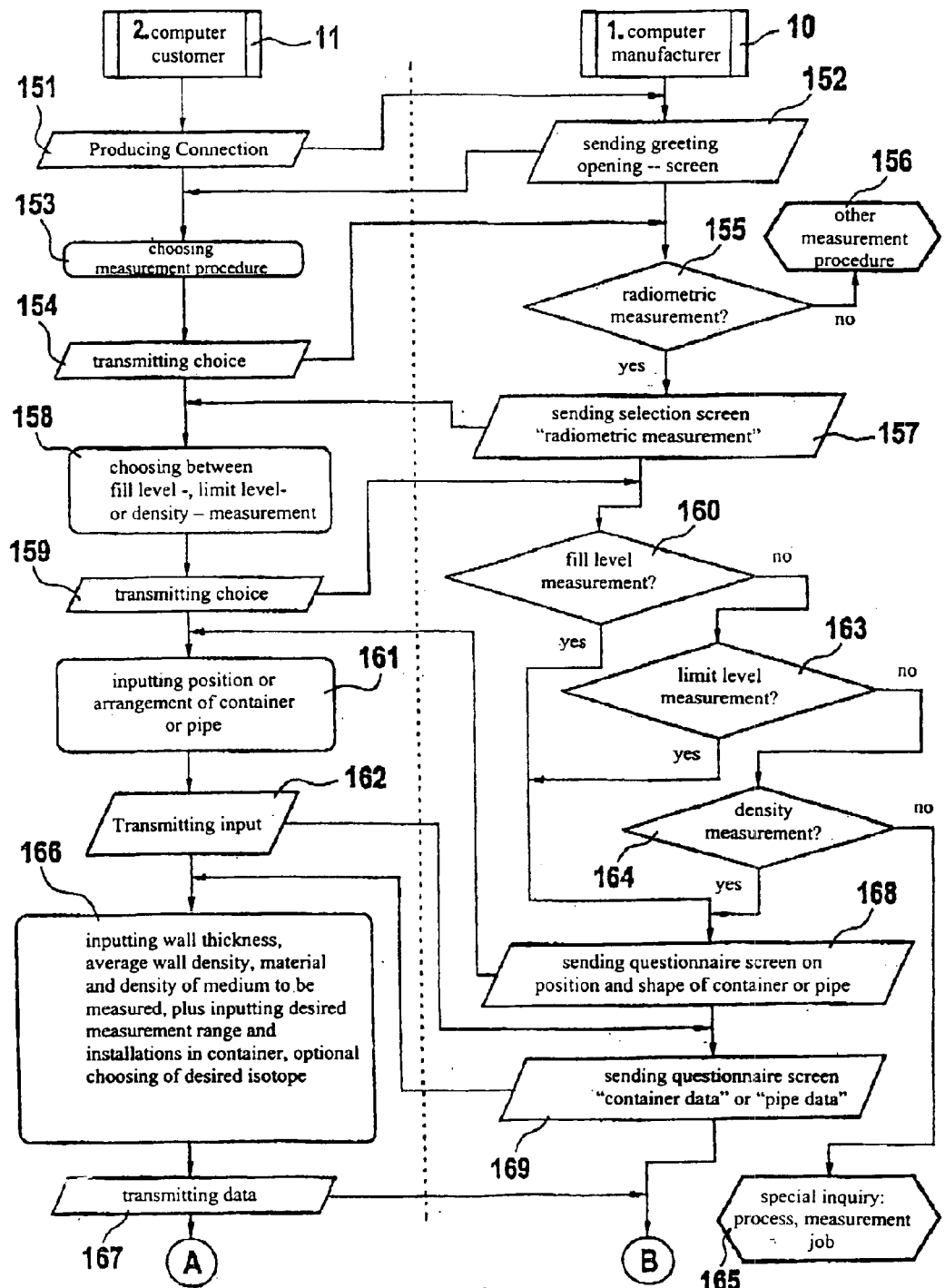

The invention is explained and described in greater detail on the basis of the following drawings, which show as follows:

FIG. 1 a schematic drawing of an arrangement, including first and second computers, for performing a method of the invention;

FIG. 2 a schematic drawing of a first arrangement of a measurement site with a radiometric measurement system for determining a fill level of a medium in a horizontal container;

FIG. 3 a schematic drawing of a second arrangement of a measurement site with a radiometric measurement system for determining a fill level of a medium in a conical, vertical container;

FIG. 4 a third arrangement of a measurement site with a radiometric measurement system for determining a fill level of a medium in an essentially cylindrical, vertical container;

FIG. 5 a fourth arrangement of a measurement site with a radiometric measurement system for determining a fill level of a medium in an essentially cylindrical, vertical container;

FIG. 6 a fifth arrangement of a measurement site with a radiometric measurement system for determining a fill level of a medium in a pipe or horizontal container;

FIG. 7a, b Examples of linearizing curves for an arrangement of a radiometric measurement system for determining a fill level of a medium;

FIG. 8 a sixth arrangement of a measurement site with a radiometric measurement system for determining a limit level of a medium in an essentially cylindrical, vertical container;

FIG. 9 a seventh arrangement of a measurement site with a radiometric measurement system for determining a limit level of a medium in an essentially conical, vertical container;

FIG. 10 an eighth arrangement of a measurement site with a radiometric measurement system for determining a limit level of a medium in a horizontal container;

FIG. 11 a ninth arrangement of a measurement site with a radiometric measurement system for determining a density of a medium in a pipe;

FIG. 12 a tenth arrangement of a measurement site with a radiometric measurement system for determining a density of a medium in a pipe;

FIG. 13 a sketch of a radiation protection container with illustration of the locational dosage levels;

FIG. 14a, b an example of an embodiment of a method of the invention, in the form of a schematically drawn flow diagram.

DETAILED DESCRIPTION OF THE PREFERRED EMBODIMENTS

FIGS. 2 to 6 and 8 and 12 show various arrangements for radiometric measurement systems, which can serve for fill level, limit level or density measurements. These drawings of measurement sites are schematic and illustrate the most important characterizing parameters of containers or pipes that are considered for the desired measurement in the method of the invention. Additionally, this type of drawing is suited for showing an optimized arrangement and assembling of a radiometric measurement system at a container or pipe, as determined by the method of the invention, in the form of a sketch on the display device of the second computer.

FIG. 1 is a schematic drawing of an arrangement with first and second computers 10 and 11, with which the method of the invention for determining and presenting an optimized arrangement and assembling of a radiometric measurement system 20, 30, 40, 50, 60, 70, 80, 90, 110, 120 at a container 21, 31, 41, 51, 61, 71, 81, 91 or a pipe 111, 121 (see in this connection FIGS. 2–9 and 11, 12) is carried out. The first computer 10 includes a processor-controlled data processing device (not described in more detail here), as well as at least one mass storage device. The second computer includes an electronic processor-controlled data processing device 14, at least one mass storage device 15 and an input device, which is preferably a keyboard 13. Of course, other input devices, such as e.g. pointing devices, can be connected for simplifying operation.

Connected to the first and second computers 10 and 11 are data exchange devices 16, over which the two computers 10 and 11 can communicate with one another. The data exchange devices 16 include, in the case of a wire-based connection, usually modems or adapters 17, which e.g. are connected over a cable 18 with a usual, public or private data transmission network, over which then an exchange of data between the two computers 10 and 11 takes place. The data transmission network can be any network which uses electrical or optical conductors or includes radio transmission stretches or even any combination thereof, such as e.g. the known networks for the telephone network, for the power supply network, for a network of optical conductor cables, for a television cable network or some other network, which also includes data transmission stretches via satellite. In the case of the currently frequently used mobile telephones, where the information transmission functions wirelessly, corresponding adapters for wireless connections 19 (shown by dashed lines in FIG. 1) are connected with the computers 10 and 11, in order to enable communication in this way between the computers 10 and 11. These and other possibilities for connecting two computers even over major distances by means of public or private networks are sufficiently well known. Both computers 10 and 11 can themselves be stand-alone computers or workstations, which are themselves part of a network.

FIG. 2 shows schematically a first arrangement 20 of a measurement site with a radiometric measurement system for determining a fill level of a medium in a horizontal container. This arrangement concerns a horizontally arranged container 21, inside of which there is a medium whose fill level is to be determined. The radiometric measurement system includes a radiation detector 24 and a radiation source in a radiation protection container 25, which are each placed laterally to the container 21. Important characterizing parameters for determining an optimized arrangement of the measurement system according to the method of the invention are an inner diameter 22 and a wall thickness 23 of the container 21. A measurement range 26, thus the range between the maximum and minimum fill height of the medium in the container 21, which is to be measured with the radiometric measurement system, is shown using a dimension line. This range is covered by the radiation detector 24. Preferably, the radiation detector 24 is aligned tangentially to the container, as shown in FIG. 2.

FIG. 3 shows schematically a second arrangement 30 of a measurement site with a radiometric measurement system for determining a fill level of a medium in a vertically erected, conical container 31. A radiation detector 34 and a radiation source in a radiation protection container 35 are each placed laterally to the container 31. Important characterizing parameters for determining an optimized arrangement of the measurement system according to the method of the invention are an inner diameter 32 and a wall thickness 33 of the container 31, as well as an angle α, with which the conicity, or conical character, of the container can be taken into consideration. The measurement range 36, in which the fill level of the medium in the container 31 is to be measured, is illustrated by a dimension line. This range is covered by the radiation detector 34, which preferably should be mounted parallel to the container wall.

FIG. 4 shows schematically a third arrangement 40 of a measurement site with a radiometric measurement system for determining a fill level of a medium in a vertically erected, cylindrical container 41. A radiation detector 44 and a radiation source in a radiation protection container 45 are each placed laterally to the container 41. Important characterizing parameters for determining an optimized arrangement of the measurement system according to the method of the invention are an inner diameter 42 and a wall thickness 43 of the container 41. The measurement range 46, in which the fill level of the medium in the container 41 is to be measured, is symbolized by a dimension line. This range is covered by the radiation detector 44, which preferably should be mounted parallel to the container wall.

FIG. 5 shows schematically a fourth arrangement 50 of a measurement site with a radiometric measurement system for determining a fill level of a medium in a vertically erected, cylindrical container 51. In this application, due to a relatively large measurement range 56, a total of three radiation detectors 54a, b, c and three radiation sources in radiation protection containers 55a, b, c are used, since one radiation detector is not sufficient to cover and register the entire measurement range. Similar considerations hold for the radiation sources in the radiation protection containers 55a, b, c. Since, for reasons of safety, only a defined angular aperture is permitted in the radiation protection containers for the emerging radioactive radiation, usually up to about 40°, a plurality of radiation sources and radiation protection containers is used when the measurement range is extended, as shown here. They are likewise placed in the same way that the radiation detectors 54a, b, c are each placed, i.e. laterally to the container 51. Important characterizing parameters for determining an optimized arrangement of the measurement system according to the method of the invention are an inner diameter 52 and a wall thickness 53 of the container 51. The measurement range 56, in which the fill level of the medium in the container 51 is to be measured, is illustrated by a dimension line. The radiation detectors 54a, b, c are preferably mounted parallel to the container wall.

FIG. 6 illustrates a fifth arrangement 60 of a measurement site with a radiometric measurement system for determining a fill level of a medium in a horizontal container 61. Here, two radiation detectors 64a, b and one radiation source in a radiation protection container 65 are placed laterally to the container 61. For horizontal containers of large diameter, the measurement range for fill level measurement can be so stretched out, that it can only be registered by a radiation detector whose length matches the diameter of the container. For various reasons, such a long radiation detector is, however, not always desired. On the one hand, it is unwieldy and its mounting inconvenient, while on the other hand, its end regions are quite far removed from the container, which can influence the measurement unfavorably. It is expedient in such cases, instead of one very long radiation detector, to use a plurality of shorter ones, which, because of their shortness, let themselves be placed better and more effectively on the container.

Important characterizing parameters for determining an optimized arrangement of the measurement system according to the method of the invention are an inner diameter 62 and a wall thickness 63 of the container 61 and the center-to-center spacings 67, 68, which determine the position of the radiation protection container 65. The measurement range 66, in which the fill level of the medium in the container 61 is to be measured, is illustrated by a dimension line.

FIGS. 7a and 7b are two examples of linearizing curves 100 and 101. These linearizing curves show for fill level measurements with radiometric measurement systems a relative fill level 102, 103 in % as a function of a standardized, measured radiometric signal 104, 105, which is given here for the examples of oblong or cylindrical detectors, or detector housing, as a standardized pulse rate over the measurement range. The standardized pulse rate is thus largest, when there is no medium in the container, i.e. in the measurement range, to damp the radioactive radiation. When the fill level 100% occurs, medium is present in the entire measurement range in the container, so that the damping of the radioactive measurement signal is greatest and the standardized pulse rate is zero.

The linearizing curves 100, 101 in the FIGS. 7a and 7b illustrate two different arrangements of the above-presented radiometric measurement systems. FIG. 7a is an example of one such linearizing curve 100, which is obtained in the case of a measurement system which includes a radiation source and a single detector. The linearizing curve 101 of FIG. 7b gives an example for a measurement system, which includes a radiation source and two detectors. The linearizing curve 101 is composed, consequently of two curve sections, one section for each of the two detectors. A dividing line 106 is shown in FIG. 7b to indicate this.

FIG. 8 shows schematically a sixth arrangement 70 of a measurement site with a radiometric measurement system for determining a limit level of a medium in a vertically erected, cylindrical region of a container 71. A radiation detector 74 and a radiation source in a radiation protection container 75 are each placed laterally to the container 71. Important characterizing parameters for determining an optimized arrangement of the measurement system according to the method of the invention are an inner diameter 72 and a wall thickness 73 of the container 71. The limit level 76 to be registered for the medium in the container 71 is symbolized by a dotted line. In the case of loose material as the medium in the container 71, the determining of the limit level must still take into account the vertical allowed extension 77 of a heaping cone above the limit level. The radiation detector 74 is preferably placed such that it lies in the desired plane of the limit level to be measured.

FIG. 9 shows schematically a seventh arrangement 80 of a measurement site with a radiometric measurement system for determining a limit level of a medium in a vertically erected, conical region of a container 81. A radiation detector 84 and a radiation source in a radiation protection container 85 are each placed laterally to the container 81. Important characterizing parameters for determining an optimized arrangement of the measurement system according to the method of the invention are an inner diameter 82 and a wall thickness 83 of the container 81, as well as an angle β, with which the conicity of the container 81 can be taken into consideration. The limit level 86 to be measured for the medium in the container 81 is symbolized by a dashed line. In the case of loose material as the medium in the container 81, the determining of the limit level must take into account the vertical allowed extension of a heaping cone above the limit level.

FIG. 10 shows schematically an eighth arrangement 90 of a measurement site with a radiometric measuring system for determining a limit level of a medium in a horizontal container 91. This arrangement concerns a horizontally arranged container 91, with the medium in the interior of the container. The drawing has been done such that the limit level about corresponds to the plane of the drawing. FIG. 10 is essentially like a top view of the container shown in FIG. 8, where, however, in contrast to FIG. 10, an undisturbed radiation passage is illustrated.

The radiometric measurement system of FIG. 10 includes a radiation detector 94 and a radiation source in a radiation protection container 95, each placed laterally to container 91. The special application illustrated here concerns a container 91, which exhibits in its interior a here schematically drawn container installation 97a (e.g. a stirrer, an input pipe or a shaft of a stirrer). Important characterizing parameters for determining an optimized arrangement of the measurement system according to the method of the invention are, consequently, along with data on the inner diameter 92 and the wall thickness 93 of the container 91, also data on the installation 97a, for example on a diameter 97b, when it concerns, as depicted here, an installation 97a of circular cross section. It is important for the method of the invention that such data be present, with which that position of the radiation protection container can be established, at which an optimum radiation passage, undisturbed by installations in the container, is obtained. The position of the radiation protection container 95 relative to the container is then described by specifications for the center-to-center spacings 98a, b.

FIG. 11 shows schematically a ninth arrangement 110 of a measuring site with a radiometric measurement system for determining a density of a medium located in a pipe 111. The radiometric measurement system includes a radiation detector 114 and a radiation source in a radiation protection container 115, which are each placed laterally to pipe 111. Important characterizing parameters for determining an optimized arrangement of the measurement system according to the method of the invention are an inner diameter 112 and a wall thickness 113 of the pipe 111. The radiation detector 114 is preferably placed parallel to the pipe 111.

FIG. 12 shows schematically a tenth arrangement 120 of a measuring site with a radiometric measurement system for determining a density of a medium located in a pipe 121. The radiometric measurement system includes a radiation detector 122 and a radiation source in a radiation protection container 123, which are each placed laterally to pipe 121. In some cases, it is required, as shown here, to enlarge the path 124, which the radioactive radiation must take in pipe 121 through the medium to be measured and/or in the radiation detector. The simplest possibility is to not orient the radiation detector 122 perpendicular or parallel to the pipe, but, instead at an angle γ, as shown in FIG. 12. This permits achievement of a better resolution for density changes. Other important characterizing parameters for determining an optimized arrangement of the measurement system according to the method of the invention are an inner diameter 125 and a wall thickness 126 of the pipe 121.

The schematic drawing of a radiation protection container 130 in FIG. 13 illustrates radiation protection- and safety-relevant, characterizing parameters that serve for calculating locational dosage levels for and at various distances from the container. In some countries, corresponding regulations are to be followed, which require such calculations and data for permitting procedures for radiometric installations, wherein the allowable maximum values are to be maintained in the various zones around the radiation protection container. Important characterizing parameters for calculating according to the method of the invention are thus, along with data on the radiation source being used, e.g. an inner diameter 131 and an outer diameter 132 of the container 130, as they are shown in FIG. 13. There, the outlet for the radiation during measurement operation is labeled "133".

For purposes of simplification, the embodiments of a radiometric measurement system shown here picture straight or rod-shaped radiation detectors. It is, however, clear for one skilled in the art that, with the method of the invention, other optimized arrangements of radiometric measurement systems, that e.g. include curved or plate-shaped radiation detectors, can be determined and presented.

How such a determining and presenting of a radiometric measurement system is done according to the invention is explained in the following with reference to FIGS. 14a and 14b, which illustrate an example of an advantageous and preferred method using a flow diagram. Since, for purposes of clarity, the flow diagram extends over two figures, connection and junction points are illustrated by encircled letters A and B.

The method for determining and presenting an optimized arrangement and assembling of a radiometric measurement system according to the invention proceeds, for example, with the assistance of an arrangement as shown in FIG. 1, wherein, for reasons of a simplified drawing, the first electronic computer 10 (see FIG. 1 and above in the description thereof) is to be associated with a manufacturer and/or supplier of such radiometric measurement systems. The second computer 11 is usually to be found with a customer interested in a radiometric measurement system or also e.g. with an installations planner, an engineering firm or another consultant, which does planning and even procurement of such radiometric measurement systems. Of course, the method of the invention illustrated in FIGS. 14a and 14b is not limited to the two exemplary computers 10 and 11, but rather it is suited also for use with several, or further, computers entering into connection with the first computer 10. For simplification, the following explanation is limited to the constellation shown in FIG. 1; the method works with further computers correspondingly.

First, a customer, a user or another person, that is interested in a radiometric measurement system, produces a connection 151 from its second computer 11 to the first computer 10, which, for example, is with a manufacturer or supplier of radiometric measurement systems. Such a connection of two or more computers with one another is usually produced over a network for long-distance data transmission, for example a wire-based or wireless telephone network, in which case it is known, per se, to dial the desired connecting computer directly over the telephone network or to create an Internet connection.

After a stable connection has been established between the first and second computers 10, 11, the first computer 10 transmits to the second computer 11 a greeting- or opening-screen 152, which is displayed on the monitor 12 of the second computer 11. With this opening-screen 152, with which the manufacturer, for example, introduces its company and its products or the services which it offers, the customer is prompted to choose a measurement procedure which it desires, be it e.g. a pressure-, a flow-, a fill level- and/or another procedure of the field of process measurement technology and to indicate a choice with the input device 13 (see FIG. 1). When the customer has made its choice 153, it sends this to the first computer 10 (see "154"), where, according to the method of the invention, a check 155 is made, whether the customer has chosen a radiometric procedure.

If the customer chooses something other than a radiometric procedure, then a method step suitable for this other measurement procedure 156 follows. Since, however, this relates to something other than the subject matter of this invention, such is not investigated further here.

In the case where the customer has decided for a radiometric procedure, the first computer 10 transmits to the second computer 11 a selection screen 157, which lists, and also might define, the various, offered radiometric measurement procedures, e.g. fill level-, limit level- or density-measurement procedures. Additionally, the customer is prompted to choose one of the radiometric measurement procedures shown on the monitor and to send the choice 158 to the first computer 10 (see "159"). Then there follows, according to the method of the invention, a checking 160, 163, 164, to determine which of the radiometric procedures the customer has chosen.

If the customer has selected a radiometric procedure for fill level measurement, then the first computer 10 sends to the second computer 11 a questionnaire screen 168, in which the customer is asked for data on the position and location of the container. Especially asked is whether this concerns a horizontally or vertically arranged, cylindrical container (see in this connection the similar arrangements of FIGS. 2, 4 and 5) and whether it has a conical form (see in this connection the similar arrangement of FIG. 3) in the measurement range of interest. If the latter is the case, the first computer 10 preferably sends a sketch 169 of an arrangement of a measurement system, as drawn in FIG. 3, for example, and by means of this, the different characterizing parameters of the measurement system are illustrated for the customer. These are, for the case of the conical container 31 of FIG. 3, particularly the inner diameter 32 and the wall thickness 33 of the container 31, as well as an angle α with which the conicity of the container can be taken into consideration, and the measurement range 36, in which the fill level of the medium in the container 31 is to be measured.

If the customer has chosen a procedure for fill level measurement in a horizontally arranged, cylindrical container, then the first computer 10 sends to the second computer 11 the questionnaire screen 168 with a sketched arrangement similar to that in FIG. 2, illustrating for the customer for data on the different characterizing parameters of the measurement system. These are, in the case of the horizontally arranged container 21 of FIG. 2, particularly an inner diameter 22 and a wall thickness 23 of the container 21, as well as the measurement range 26.

If the customer has chosen a procedure for fill level measurement in a vertically arranged, cylindrical container, then the first computer 10 sends to the second computer 11 the questionnaire screen 168 with a sketched arrangement similar to that in FIG. 4, illustrating for the customer for data on the different characterizing parameters of the measurement system. These are, in the case of the vertically arranged container 41 of FIG. 4, particularly an inner diameter 42 and a wall thickness 43 of the container 41, as well as the measurement range 46.

In case the customer has chosen a radiometric procedure for limit level measurement, then the first computer 10 sends to the second computer 11 a questionnaire screen 168, in which the customer is asked for data on position and location of the container. In particular, asked in this case are whether it concerns a cylindrical container 71, 91 (see in this connection the similar arrangements of FIGS. 8, 10) and whether the container 81 (see in this connection the similar arrangement of FIG. 9) exhibits a conical shape. The first computer 10 sends for this purpose preferably a sketch 168 of an arrangement of a measurement system as illustrated, for example, in FIG. 7, 8 or 9 and by such means the different characterizing parameters of the measurement system are illustrated for the customer. Especially, these are (see in this connection FIG. 9) the inner diameter 82 and the wall thickness 83 of the container 81, as well as an angle β, with which the conicity of the container 81 can be taken into consideration. The limit level 86 to be registered for the medium in the container 81 is symbolized by a dashed line. In the case of loose material as the medium in container 81, the determining of the limit level must take into account the vertical allowed extension of a heaping cone above the limit level.

In the case where the customer has chosen a density measurement, which is performed frequently in the case of streaming or flowing media in pipes, the first computer 10 sends to the second computer 11 the questionnaire screen 168, in which is customer is asked for data on position and location of the pipe 111 (see FIG. 11). The first computer 10 sends for this purpose preferably a sketch 168 of an arrangement of a measurement system, such as shown, for example, in FIG. 11, in order to illustrate for the customer the different characterizing parameters of the measurement system, such as e.g. an inner diameter 112 and a wall thickness 113 of the pipe 111.

In all the described questionnaire screens 168, a radioactive preparation, e.g. with an isotope cesium 137, usual for the chosen arrangement is suggested to the customer. The customer is, however, given the chance to choose another isotope, e.g. cobalt 60, from a list of alternative suggestions.

Should the customer select none of the mentioned radiometric procedures for fill level-, limit level- or density-measurement, then it probably concerns a special, different kind of inquiry 165, which is not discussed further here, because it does not relate to the subject matter of the present invention.

If the customer has entered the desired data on the particular containers, on the pipe and perhaps even for the medium and isotope, or preparation, on the questionnaire screen 166, these data 167 are transmitted to the first computer 10.

On the first computer 10, an optimized arrangement of the radiometric measurement system at or on the container or pipe is then calculated on the basis of the container- or pipe-specific data received from the second computer for the selected measurement procedure.

From the various data and/or pattern arrangements of different radioactive preparations, radiation protection containers and detectors of the most varied type, size and shape, the best suited combinations are sought out for the characterizing parameters transmitted from the customer, wherein perhaps already previously developed and/or practice-proven arrangements can be taken into consideration. An especially important aspect for the determining and designing the customer-specific radiometric measurement system regards determining the activity of the radiation source, or sources, best for the measurement or measurements.

Among other things, it is determined (see "170" in FIG. 14b) in detail and with attention to the radiation-sources, -containers and -detectors obtainable from a manufacturer or in the market from various manufacturers, whether a single radiation source 25, 35, 45 and a single detector 24, 34, 44 is sufficient for the customer-specific radiometric measurement system and the given measurement range 26, 36, 46 (see FIGS. 2, 3, 4) or whether several detectors 54a–c or 64a, b (see in this connection FIGS. 5 and 6) and several radiation sources 55a–c (see in this connection FIG. 5) are needed for the desired measuring.

After the sufficient (and required) number of radiation sources and detectors has been determined, the spacings of the radiation sources and detectors, needed from the technical and safety points of view and fitting possible wishes of the customer, are determined and the geometric arrangement at the particular container or pipe fixed. With all these data a sketch 171 is then produced, which e.g. looks like one of the drawings of FIGS. 2 to 5 or 8 to 12, but now also contains all determined characterizing data for the particular arrangement. The complete sketch 171 of the invention produced on the first computer 10 is, as illustrated by "172", transmitted to the second computer 11, thus, for example, to the customer, where it is displayed on the monitor 12 there (see FIG. 1).

For the case of designing a radiometric measurement system for fill level measurements (see FIGS. 2 to 5), the available data is advantageously used to determine a linearizing curve, similar to that of FIG. 7a or FIG. 7b, for the desired arrangement and likewise transmitted to the second computer and shown there.

In the case of design of a radiometric measurement system for a density measurement (see FIGS. 11, 12), the available information is preferably used to determine values on the first computer 10 to help the user to calculate possible fluctuations of the measurement values in the density measurement due to concentration changes in the medium. These values 173 are transmitted to the second computer 11 e.g. in the form of curves or tables.

In again other cases, it is helpful for the customer to have information on the distribution of the locational dosage levels around the radiation protection container or containers of the above-described radiometric measurement systems. Also such a calculation is, if necessary, performed on the first computer 10 in the context of the method of the invention and transmitted to the second computer 11 in the form of a sketch like the drawing of FIG. 13. In this connection, for example, the locational dosage levels, e.g. in μSv/h, are given for an essentially spherical surface with the inner diameter 131 and for a corresponding essentially spherical surface with the outer diameter 132 around the radiation protection container 130.

Figure 14B:
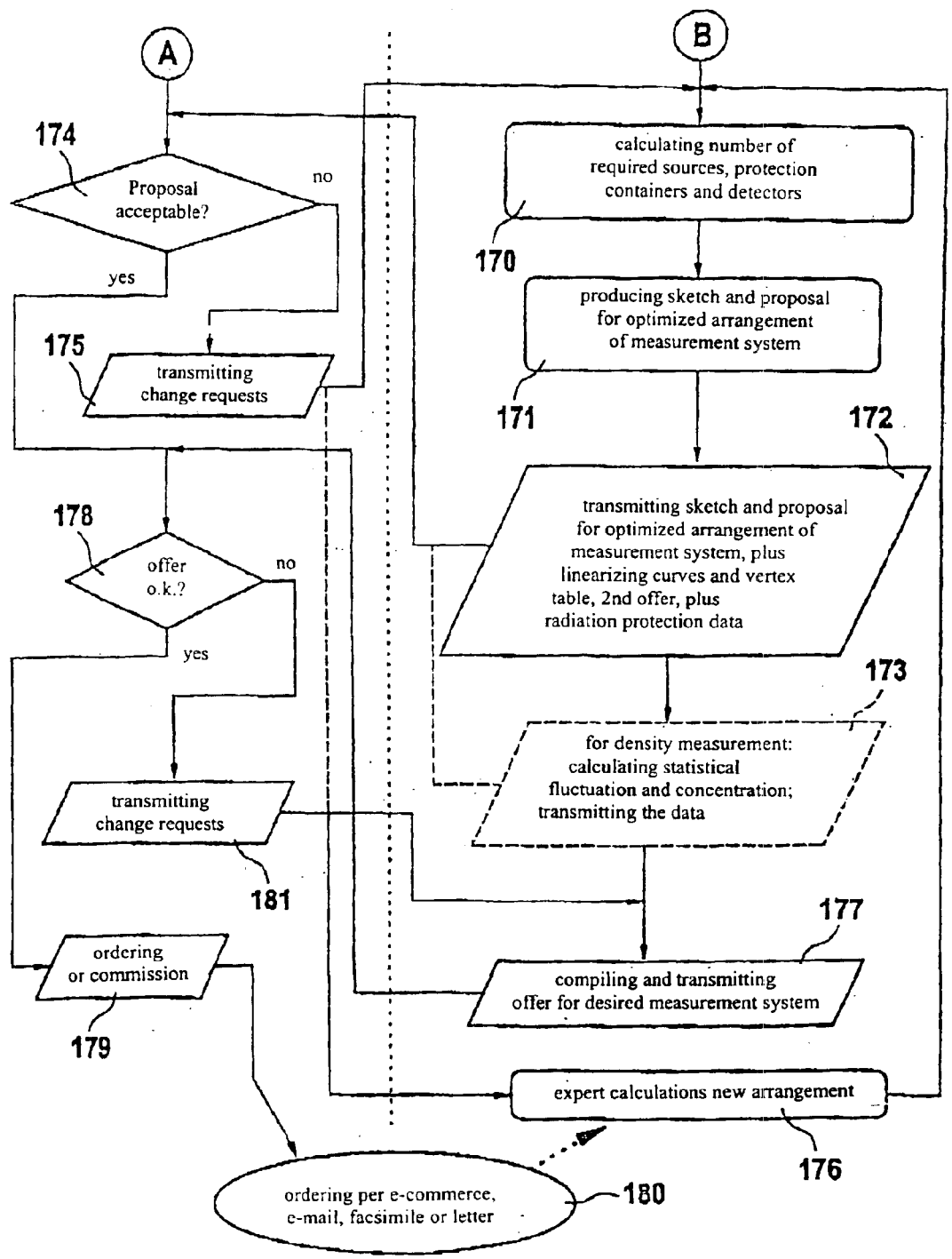

The customer will then review the data and drawings 172, 173 transmitted from the first computer 10 for the design and arrangement determined according to the invention for the desired radiometric system (see in this connection "174" in FIG. 14b). If the customer is in agreement, such is reported to the first computer.

Should the proposal with data and drawings 172, 173 transmitted from the first computer 10 not find the approval of the customer, then the customer will report its desired changes 175. Next a new calculation takes place on the first computer 10 for determining and designing the customer-specific radiometric measurement system, which process flows essentially as above, however using the altered characterizing parameters. These possibilities for changing the arrangement can be carried out repeatedly, until the customer declares its agreement with an arrangement of the measurement system calculated and determined on the first computer 10. Should, however, there be special need for a calculation and design of a very specific and extraordinary radiometric measurement system, the method of the invention offers also the possibility to have a custom calculation and design carried out by an expert (see "176" in FIG. 14b). The measurement system determined by this expert is developed corresponding to the above-described flow of method steps and transmitted to the customer on the second computer 11.

When the first computer 10 has received the approval of the customer with the determined radiometric measurement system, then the available relevant purchase data on individual components of the measurement system, such as e.g. order-no. and prices for the detector, radiation protection container, etc., to be installed, is used to produce a comprehensive offer 177 for a complete measurement system, and such is transmitted, together with sales and legally relevant delivery conditions, to the second computer 11 and displayed there.

If the customer, following review 178, accepts this offer, then it issues, if necessary, the order 179, which then can be processed and settled in any form 180, for example by facsimile, letter or also within the framework of a so-called E-commerce action.

Should the customer not be in agreement with the offer transmitted to the second computer and produced according to the invention, then he reports his change requests 181 to the first computer 10, so that then a new offer 177 can be produced there according to the above-described flow, and, in fact, as often as necessary until the customer declares its approval and issues the order 179, 180.

The above-described embodiments of the method of the invention concern those kinds of methods, in which container-, pipe- and media-specific data or characterizing data are entered by a user or customer and are transmitted to the first computer 10. It is, however, possible within the scope of the invention that the user or customer can select container-, pipe- and media-specific data or characterizing data from one or more databases present in the first computer and that these data are used in the determining and presenting of an optimized design and arrangement of the radiometric measurement system according to the invention.

In order to keep such database or databases up to date, it makes sense, for the cases where the user or customer has no data to use from already present databases, but, instead, would itself enter missing container-, pipe- and media-specific data or characterizing data, that the databases be provided with these new data first.

Furthermore, it is conceivable that the method for determining and presenting an optimized design and arrangement of the radiometric measurement system be part of a more comprehensive method for determining and presenting optimized arrangements of various other measurement systems of an industrial production plant within the framework of a project management. This more comprehensive method can proceed, in principle, in manner similar to that used for the radiometric method.

What is claimed is:

1. A method for determining and presenting an optimized arrangement and assembly of a radiometric measurement system or measurement site of an industrial process measurement-and/or process control installation, which measurement system serves for measuring at least one process variable or process parameter and which method proceeds with the aid of at least one first electronic computer and a second electronic computer connected therewith, which second electronic computer includes a display-, a processor-controlled data processing-, and an input-device, the method including the steps of:

calculating an optimized arrangement of the measurement system on the basis of process-specific data, especially such that have an influence on the process parameter measured by the measurement system, that are transmitted from the second computer to and into the first computer;

producing a schematic drawing presenting the arrangement of the measurement system optimized therefor and such drawing is presented on the display-device of the second computer;

calculating an optimized arrangement of at least one radiation source and at least one radiation detector of the radiometric measurement system at or on the container or pipe, with the aid of container- or pipe-specific data, especially data on the basic form and on position, diameter, wall thickness and/or materials and on a measurement range to be expected, which are transmitted from the second computer to and into the first computer;

calculating the activity of the radiation source or radiation sources best suited for the measuring or measurings; and producing a schematic drawing presenting the container or the pipe and the arrangement of the radiometric measurement system optimized therefor and presenting it on the display-device of the second computer.

2. The method as claimed in claim 1, further comprising the step of:

producing additionally a linearizing curve and/or a linearizing table servicing for evaluating the measurement parameters measured with the detector or detectors for the special, optimized arrangement of the radiometric measurement system at the container or pipe.

3. The method as claimed in claim 1, further comprising the step of:

stabilizing a selection of suited devices or components for a radiometric measurement system corresponding to the optimized arrangement and compiled on the first computer with the aid of device-specific data in a database administered from there, said selection is subsequently transmitted to the second computer and displayed on its display device.

4. The method as claimed in claim 1, in which an optimized arrangement of a radiometric measurement system for measuring a fill level of the medium contained in the container is determined and presented.

5. The method as claimed in claim 4, in which an optimized arrangement of a radiometric measurement system for any combination of measurings of limit level, density and/or fill level of the medium is determined and presented.

6. The method as claimed in claim 1, in which an optimized arrangement of a radiometric measurement system for measuring a density of the medium contained in the pipe is determined and presented.

7. The method as claimed in claim 1, in which an optimized arrangement of a radiometric measurement system for measuring a limit level of the medium contained in the container is determined and presented.

8. The method as claimed in claim 1, in which additional accessories for the radiometric measurement system are determined and presented.

9. The method as claimed in claim 1, in which radiation protection-relevant calculations are performed and presented for at least one radiation protection container for the radiation source or sources.

10. The method as claimed in claim 1, in which radiation protection-relevant calculations for at least one radiation detector are performed and presented.

11. The method as claimed in claim 1, in which radiation protection-relevant calculations are performed and presented for an empty container or an empty pipe.

12. The method as claimed in claim 1, in which the first and the second computers are connected with one another by means of at least one data exchange device and/or over a cable connection.

13. The method as claimed in claim 1, in which the first and the second computers are connected with one another cablelessly over at least one data exchange device.

14. The method as claimed in claim 1, in which at least one of the two computers is a stand-alone computer or a work station of a network including other computers.

15. The method as claimed in claim 1, in which the data exchange device is a modem and/or another adapter for wireless connection with the telephone network.

16. The method as claimed in claim 1, in which a further determining and presenting of an optimized arrangement and assembly of a radiometric measurement system at a container or pipe is performed on the basis of another radiation source or other radiation sources and/or other detectors and the results are presented on the second computer.

17. The method as claimed in claim 1, wherein specific data on the first computer present in the form of a database on media are used.

18. The method as claimed in claim 17, wherein the databases are updated after every determining and presenting of an optimized arrangement of a radiometric measurement system by newly entered data on container, pipe and/or medium.

19. The method as claimed in claim 1, wherein specific data on the first computer present in the form of a database on materials for container- or pipe-walls are used.

20. The method as claimed in claim 1, characterized in that it is part of a more inclusive method for determining and presenting optimized arrangements of measurement systems of an industrial production plant within the framework of a project management.

21. The method as claimed in claim 1 for determining and presenting an optimized arrangement and assembly of at least one pressure measurement system at a container or pipe, which measurement system serves for measuring a pressure and/or a difference pressure.

* * * * *